(12) United States Patent
Watanabe et al.

(10) Patent No.: US 10,901,122 B2
(45) Date of Patent: Jan. 26, 2021

(54) SCREEN FOR DISPLAY

(71) Applicant: KURARAY Co., Ltd., Kurashiki (JP)

(72) Inventors: Junji Watanabe, Kamisu (JP); Masaru Karai, Kamisu (JP); Tomohiro Takahashi, Kamisu (JP); Chikafumi Kurahashi, Kamisu (JP)

(73) Assignee: KURARAY Co., Ltd., Kurashiki (JP)

( * ) Notice: Subject to any disclaimer, the term of this patent is extended or adjusted under 35 U.S.C. 154(b) by 0 days.

(21) Appl. No.: 16/069,344

(22) PCT Filed: Jan. 11, 2017

(86) PCT No.: PCT/JP2017/000551
§ 371 (c)(1),
(2) Date: Jul. 11, 2018

(87) PCT Pub. No.: WO2017/122651
PCT Pub. Date: Jul. 20, 2017

(65) Prior Publication Data
US 2019/0018170 A1 Jan. 17, 2019

(30) Foreign Application Priority Data
Jan. 12, 2016 (JP) ................. 2016-003410

(51) Int. Cl.
| | | |
|---|---|---|
| G02B 9/00 | (2006.01) | |
| G02B 9/08 | (2006.01) | |
| G02B 5/00 | (2006.01) | |
| G03B 21/62 | (2014.01) | |
| G02B 27/01 | (2006.01) | |
| G02B 3/00 | (2006.01) | |

(52) U.S. Cl.
CPC .......... *G02B 5/003* (2013.01); *G02B 3/0006* (2013.01); *G02B 27/01* (2013.01); *G02B 27/0101* (2013.01); *G03B 21/62* (2013.01)

(58) Field of Classification Search
CPC ...... G02B 21/602; G02B 5/003; G02B 3/006; G02B 27/01; G02B 27/0101; G03B 21/625
See application file for complete search history.

(56) References Cited

U.S. PATENT DOCUMENTS

| | | | |
|---|---|---|---|
| 6,633,351 B2 | 10/2003 | Hira et al. | |
| 2001/0012078 A1* | 8/2001 | Hira ..................... | G02B 3/0031 349/95 |

(Continued)

FOREIGN PATENT DOCUMENTS

| | | |
|---|---|---|
| CN | 101405637 A | 4/2009 |
| JP | 10-39769 A | 2/1998 |

(Continued)

OTHER PUBLICATIONS

Extended European Search Report dated Aug. 9, 2019 in European Patent Application No. 17738405.4, 8 pages.

(Continued)

*Primary Examiner* — Alicia M Harrington
(74) *Attorney, Agent, or Firm* — Oblon, McClelland, Maier & Neustadt, L.L.P.

(57) ABSTRACT

The present disclosure pertains to the field of screen. It is an object of the present disclosure to provide a transmissive screen including a microlens array. The screen of the present disclosure further comprises an aperture array arranged on a surface opposite to the surface on which the microlens array is disposed. A light shielding portion of the aperture array is a metal film. The transmissive screen of the present disclosure can be used for a display.

9 Claims, 11 Drawing Sheets

(56) References Cited

U.S. PATENT DOCUMENTS

| | | | |
|---|---|---|---|
| 2006/0268404 A1* | 11/2006 | Hyobu | G03B 21/10 359/456 |
| 2007/0002453 A1 | 1/2007 | Munro | |
| 2013/0340680 A1* | 12/2013 | Sonoda | C23C 14/243 118/720 |

FOREIGN PATENT DOCUMENTS

| | | |
|---|---|---|
| JP | 10-241434 A | 9/1998 |
| JP | 11-344602 A | 12/1999 |
| JP | 2001-201611 A | 7/2001 |
| JP | 2012-208440 A | 10/2012 |
| JP | 2014-149405 A | 8/2014 |

OTHER PUBLICATIONS

Office Action dated Jun. 20, 2019 in Korean Patent Application No. 10-2018-7021403 (with unedited computer generated English translation), 15 pages.

International Search Report dated Apr. 11, 2017, in PCT/JP2017/000551 filed Jan. 11, 2017.

Office Action dated Dec. 26, 2019 issued in corresponding Korean patent application No. 10-2018-7021403 (with English translation).

* cited by examiner

SCREEN FOR DISPLAY

TECHNICAL FIELD

The present disclosure relates to a screen for display, and in particular to a transmissive screen.

BACKGROUND ART

Patent Literature 1 discloses a transmissive screen for a head-up display (HUD). Such a screen includes a microlens array positioned on the incident side of laser light and an aperture array positioned on the output side (Claim 1 of Patent Literature 1). The light shielding portion of the aperture array is formed of a material that absorbs visible light such as a black resist (paragraph [0052] of Patent Literature 1).

The head up display of Patent Literature 1 can absorb external light reaching the screen by the light shielding portion (paragraph [0054] of the same Literature). Accordingly, the contrast of the displayed image can be enhanced by reducing the external light reflection on the screen (paragraph [0056] of the same Literature).

CITATION LIST

Patent Literature

Patent Literature 1: Japanese Unexamined Patent Application Publication No. 2012-208440

SUMMARY OF INVENTION

Technical Problem

The light shielding portion of the above-described aperture array absorbs external light. Accordingly, the light shielding portion acts as a heat collector for the external light. As a result, overheating of the light shielding part may cause overheating of the entire screen.

Solution to Problem (1) A transmissive screen including a microlens array,
the screen further including an aperture array disposed on a surface opposite to a surface on which the microlens array is disposed, in which
a light shielding portion of the aperture array is a metal film.
(2) The screen recited in item (1), wherein the metal film is a vapor-deposited film.
(3) The screen recited in item (1) or (2), wherein an outer surface of the metal film has a mirror surface.
(4) The screen recited in any one of items (1) to (3), wherein the outer surface of the metal film has a reflectance of 80% or more of light having a wavelength of 380 nm to 780 nm.
(5) A head-up display including the screen recited in any one of items (1) to (4), wherein
an image light is projected onto the screen from the microlens array side, and
an inner diameter of an aperture of the aperture array is equal to or larger than a diameter of spread of the image light on a cross section at the aperture.
(6) A head-up display including the screen recited in any one of items (1) to (4), wherein
the screen is tilted such that the screen is inclined with respect to an optical axis of the image light projected onto the screen from the microlens array side,
the head-up display further including a light absorbing portion absorbing an external light reflected by the light shielding portion.
(7) A method of manufacturing a transmissive screen including a microlens array and an aperture array disposed on an opposite side of the microlens array, the method including, in forming the aperture array on a transparent base member on one side of which the microlens array is formed, the steps of:
applying a negative resist to an opposite surface of the transparent base member on one surface of which the microlens array is disposed;
irradiating the transparent base member with an exposure light, the exposure light being emitted toward the transparent base member from the microlens array side;
exposing the negative resist with the exposure light and further developing the negative resist to form a resist pattern;
forming a metal film on a surface of the transparent base member on which the resist pattern has been formed; and
removing the resist pattern to form the aperture array made of the metal film.
(8) The method for manufacturing the screen recited in item (7), wherein
an image point of the exposure light with respect to a microlens of the microlens array is in front of the coated negative resist with respect to the microlens,
the metal film is formed by vapor deposition, and
the resist pattern is removed by lift-off.
(9) The method for manufacturing the screen recited in item (8), wherein in the vapor deposition, a direction of a vapor flow impinging on a surface of the transparent base member is not inclined or is inclined by 0° to 20° with respect to a normal direction of the surface of the transparent base member.
(10) The method for manufacturing the screen recited in item (7), wherein
an image point of the exposure light with respect to the microlens of the microlens array is farther from the microlens than the coated negative resist,
the metal film is formed by vapor deposition,
the resist pattern is removed by lift-off, and
in the vapor deposition, a direction of a vapor flow impinging on a surface of the transparent base member is inclined by 20° to 60° with respect to a normal direction of the surface of the transparent base member.
(11) A method of manufacturing a head-up display whose screen is produced by the method recited in any one of items (7) to (10) and arranged such that an image light is projected from the microlens array side to the screen, wherein
at least one of the exposure light and the image light is adjusted so that an image point distance of the exposure light with respect to the microlens of the microlens array is equal to an image point distance of the image light.

Advantageous Effects of Invention

According to the present disclosure, it is made possible to suppress overheating of a transmission type screen.

DESCRIPTION OF EMBODIMENTS (Screen)

Figure 1:
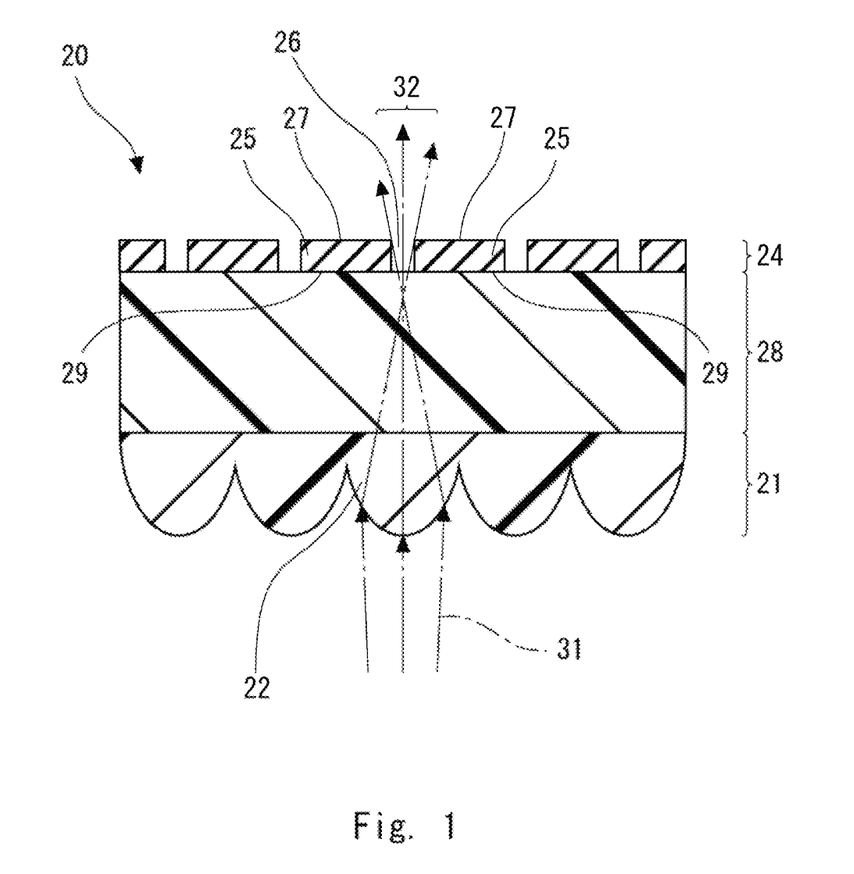
FIG. 1 is a cross-sectional view of a screen.

FIG. 1 illustrates a cross-sectional view of a transmissive screen 20. The screen 20 includes a microlens array 21 and an aperture array 24. The aperture array 24 is arranged on the surface on the other side of the surface on which the microlens array 21 is arranged. The microlens array 21 and the aperture array 24 are arranged on a transparent base member 28 made of resin.

The screen 20 illustrated in FIG. 1 let an image light 31 pass therethrough. At this point, individual microlenses 22 of the microlens array 21 generate diffusion 32 of the image light 31. Accordingly, as the orientation of the optical axis of the image light 31 is dispersed, the screen 20 functions as an optical screen. In addition, the diffusion angle in the diffusion 32 can be made as desired in accordance with the design of the microlens 22. The diffusion angle may be defined as a spread angle which represents positions at which a value of luminance of the diffused image light 31 becomes equal to a half value of the center luminance of the image light 31. The microlens 22 has a convex surface projecting outward of the screen 20, i.e., downward in the figure.

The aperture array 24 illustrated in FIG. 1 includes a light shielding portion 25 and an aperture 26. Accordingly, the diffused image light 31 which has been diffused as described above finally passes through the screen 20 via the aperture 26. In other words, it is preferable that the light shielding portion 25 is provided only in the portions other than the portion through which the image light 31 passes.

It is preferable that the inner diameter of the aperture 26 illustrated in FIG. 1 is equal to or larger than the diameter of the spread of the image light 31 on the cross section of the image light 31 at the aperture 26. For example, it is so designed in a head-up display that includes the screen 20. According to such an aspect, the image light 31 reflected by an inner surface 29 of the light shielding portion 25 can be reduced. The inner surface 29 is a surface of the light shielding portion 25 and located on the top surface side of the transparent base member 28, i.e., the surface opposite an outer surface 27.

Figure 2:
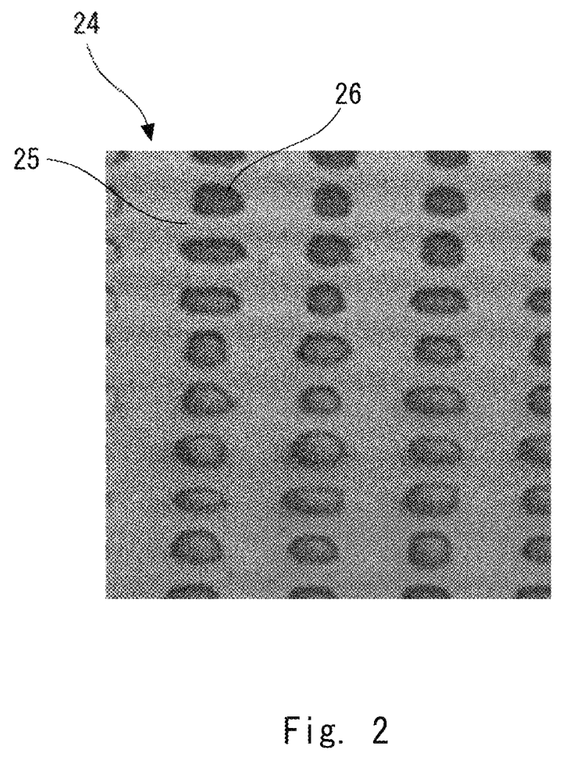
FIG. 2 is a captured image of an aperture array.

FIG. 2 is an image obtained by capturing one example of the aperture array 24. As illustrated in the captured image, apertures 26 are arranged in a lattice pattern on the aperture array 24. The aperture 26 is surrounded by the light shielding portion 25. The light shielding portion 25 is a metal film. It is preferable that the metal film is a film formed by any one of vapor deposition, sputtering, and electroforming. It is preferable that the metal film is a vapor-deposited film.

Referring again to FIG. 1, it is preferable that the outer surface 27 of the metal film constituting the light shielding portion 25 has a mirror surface. In the light shielding portion 25, the outer surface 27 is the surface farther from the microlens array 21. On the outer surface 27, the reflectance of light having a wavelength of 380 nanometers (nm) to 780 nm is preferably 80% or more, more preferably 83% or more, and further preferably 87% or more.

The reflectance of the outer surface 27 illustrated in FIG. 1 is obtained, for example, from a value resulting when irradiating a metal film with light, the metal film being fabricated in the same manner as the light shielding portion 25 and having no aperture and measuring the brightness of the reflected light using a spectrophotometer. In this measurement, it is preferable that the incident light is incident on the outer surface 27 at an angle of 10 degrees with respect to the normal line of the outer surface 27. For example, U-4100 manufactured by Hitachi High-Tech Science Corporation may be used as the spectrophotometer.

(Head-Up Display)

Figure 3:
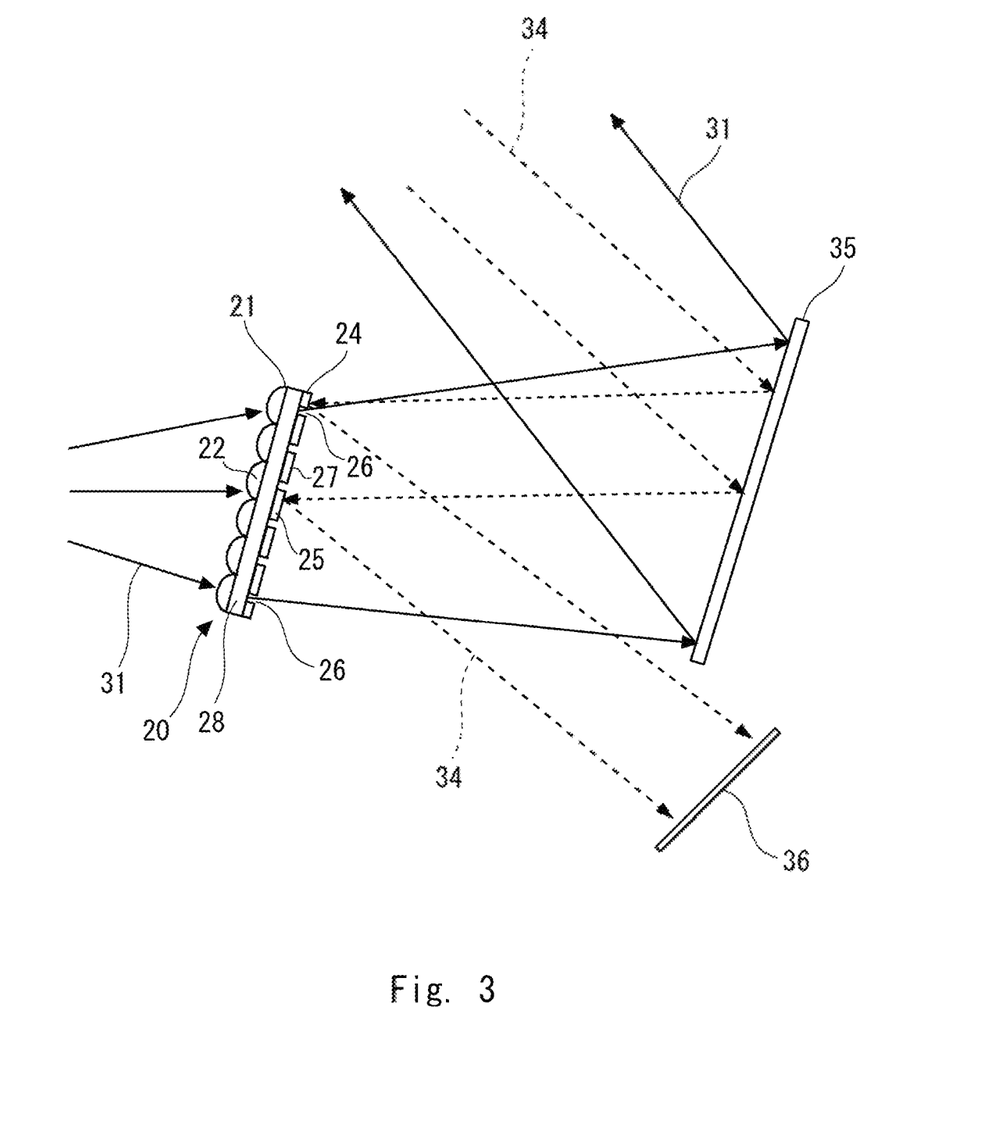
FIG. 3 is a schematic diagram of an optical system of a head-up display.

An optical system 30 of the head-up display is illustrated in FIG. 3. Such a head-up display includes the screen 20. The screen 20 constitutes a part of the optical system 30.

The image light 31 indicated by the solid line in FIG. 3 is projected onto the screen 20 from the microlens array 21 side. The image light 31 is generated by, for example, a picture generation unit (PGU). The image light 31 is guided to the screen 20 by a projection optical system.

The image light 31 illustrated in FIG. 3 is diffused by the microlens array 21. The image light 31 passes through the screen 20. The image light 31 is emitted from the screen 20 as diffused light and is reflected by a concave mirror 35. Thereafter, the image light 31 is presented as an image of a virtual image to an observer viewing the head-up display.

As illustrated in FIG. 3, the screen 20 includes the microlens array 21. By virtue of this, the diffusion angle, efficiency, and the like of the screen 20 can be readily controlled by the microlens array 21. In addition, use of the microlens array 21 makes it possible to adjust the image presented by the image light 31 so that it has an angle of view at which the observer can readily view the image.

Here, let us consider a case where the head-up display is mounted in a vehicle and the vehicle is arranged outdoors. In this case, sunlight may enter the optical system 30 illustrated in FIG. 3 as an external light 34. The external light 34 indicated by the broken line in FIG. 3 is reflected by the concave mirror 35. In addition, after the reflection, the external light 34 may reach the screen 20.

When the screen 20 illustrated in FIG. 3 is arranged on a plane perpendicular to the optical axis of the image light 31, the external light 34 entering from the opposite direction to the image light 31 is reflected by the screen 20. Specifically, it is reflected by the microlens array 21 or the aperture array 24. At this point, since the optical axis of the image light 31 and the optical axis of the external light 34 are parallel to each other, there is a possibility that the external light 34 is mixed with the image light 31.

When the external light 34 is mixed with the image light 31 illustrated in FIG. 3, the image presented by the image light 31 is whitened. Accordingly, the contrast of the image is lowered. For an observer, for example, a driver of a vehicle, not only the visibility of the image is deteriorated but also glaring portions are visually recognized in the image. Such a problem is not limited to the case where the external light 34 is sunlight. The same problem arises in any other cases where the head-up display is not mounted on a vehicle.

In accordance with this embodiment, as illustrated in FIG. 3, the screen 20 is inclined so that the optical axis of the image light 31 emitted from the aperture 26 is not parallel to the optical axis of the external light 34 reflected by the light shielding portion 25. The screen 20 is inclined such that the screen 20 is inclined with respect to the optical axis of the image light 31 projected on the screen 20 from the microlens array 21 side. As a result, the entering external light 34 can escape in a direction different from the optical axis of the image light 31. Accordingly, since the external light 34 is not easily mixed with the image light 31, whitening of the image is suppressed.

As illustrated in FIG. 3, the head up display in accordance with this embodiment further includes a light absorbing portion 36. The external light 34 reflected by the light shielding portion 25 strikes the light absorbing portion 36. The light absorbing portion 36 is subjected to black painting, alumite treatment, and the like. The light absorbing portion 36 absorbs the external light 34. Accordingly, occurrence of a phenomenon where the external light 34 becomes stray light in the optical system 30 is suppressed.

As described in the background art section, even if a black matrix like a black resist is used as a substitute for the light shielding portion 25, the contrast of the image can be enhanced. However, since the external light 34 illustrated in FIG. 3 is collected on the screen by the concave mirror 35, the energy of the external light 34 is efficiently absorbed with the black matrix. Accordingly, the screen may be easily overheated along with the black matrix.

Here, when the screen is made of a transparent base member made of resin, deformation or ignition of the screen may be caused. For this reason, an absorptive type contrast enhancing means such as a black matrix is not suitable for the screen in a head-up display. Such a problem is not limited to the case where the external light 34 is sunlight. The same problem may arise even in any other case where the head-up display is not mounted in a vehicle.

On the other hand, in accordance with this embodiment, as illustrated in FIG. 3, the external light 34 that has reached the screen 20 can escape to the light absorbing portion 36. This is because the screen 20 is provided with the light shielding portion 25 made of a metal film. The light shielding portion 25 reflects the external light 34 by regular reflection. As a result, the light shielding portion 25 is not easily overheated and accordingly the screen 20 is not easily overheated.

(Method for Forming Microlens Array)

The microlens array 21 illustrated in FIG. 1 can be formed as a sheet in accordance with a known method. The mold used to shape the microlens array sheet may be formed by cutting. In addition, a template may be formed by photolithography to form the mold on the basis of such a template. The mold may be fabricated by laser ablation. Any mold can be used as long as it can withstand the shaping of the microlens array sheet.

In the shaping of the microlens array 21 illustrated in FIG. 1, various means suitable for shaping a resin sheet, such as injection molding, press molding, and shaping by ultraviolet curing, can be used. Further, the sheet obtained by shaping may be attached to the transparent base member 28. Further, a resin disposed on the transparent base member 28 may be shaped.

(Method for Forming the Opening Array)

In the meantime, in forming the aperture array, it is necessary to pay attention to the following aspect. Specifically, as illustrated in FIG. 3, the aperture array 24 blocks the external light 34 but does not block the image light 31. Accordingly, it is necessary to accurately form a pattern of the aperture array on the transparent base member 28 in accordance with the arrangement of the microlenses 22 in the microlens array 21.

It is preferable in this embodiment to use self-alignment exposure as the pattern forming method. In the self-alignment exposure, a photoresist is exposed using the light collection function of the microlens array 21 as such illustrated in FIGS. 1 and 3. When the self-alignment exposure is used, it is preferable to combine a lift-off method to selectively remove an unnecessary metal film so as to form the aperture 26.

Figure 4:
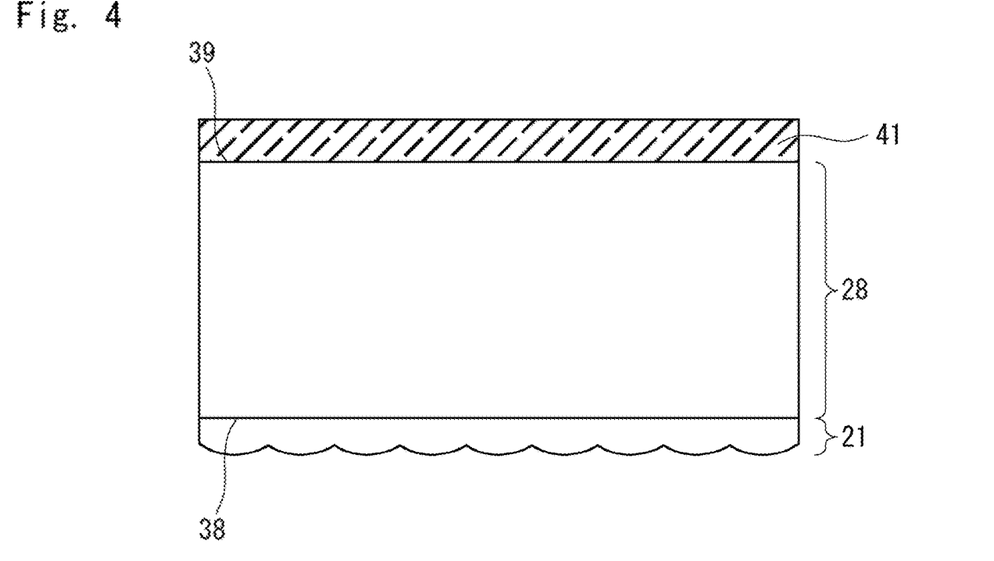
FIG. 4 is a schematic diagram of application of a resist.

The method of forming the aperture array on the transparent base member 28 will be described with reference to FIGS. 4 to 8. FIG. 4 is a schematic diagram of resist application. The microlens array 21 is formed on one side of the transparent base member 28, i.e., the bottom surface 38. The resist 41 is applied to the top surface 39 of the transparent base member 28. The top surface 39 is a surface opposite to the bottom surface 38. The resist 41 is a negative resist. It is preferable that the resist 41 comprises a photosensitive resin.

Spin coating, die coating, spray coating, roll coating, and the like can be used as the method of coating the resist 41 on the top surface 39 illustrated in FIG. 4. Further, drying is performed to volatilize the solvent of the applied resist 41. For drying, a hot plate, oven, vacuum dryer, infrared heater, and the like can be used. As a method that does not involve application and drying, a method of laminating a film resist can be adopted.

Figure 5:
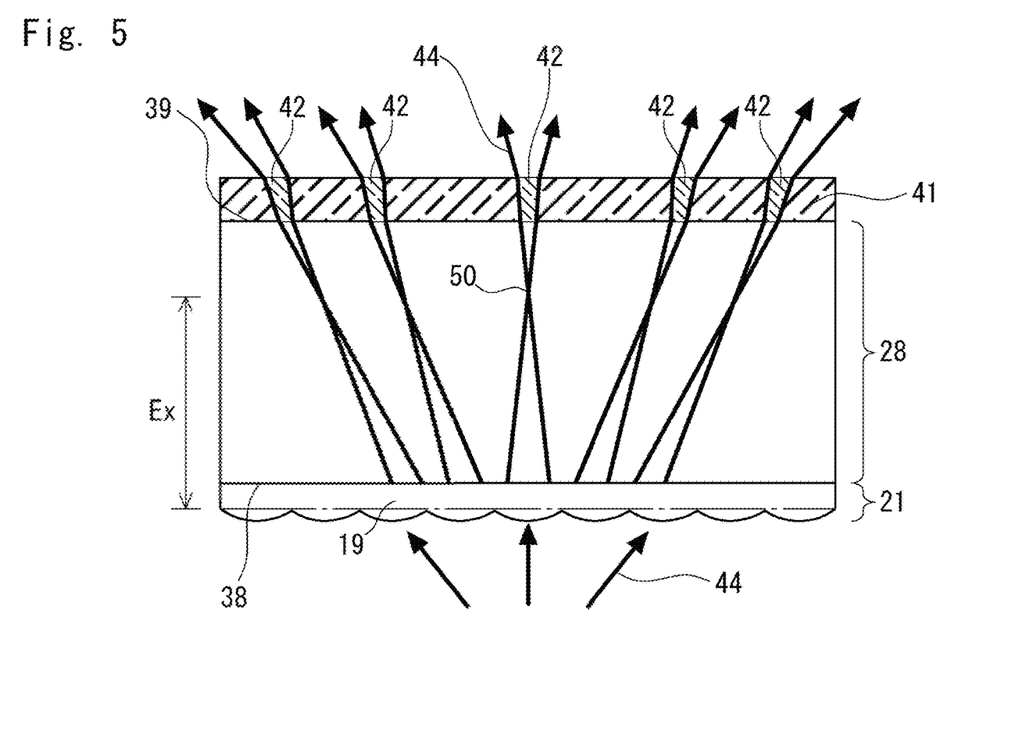
FIG. 5 is a schematic view of exposure of the resist.

FIG. 5 is a schematic view of exposure of the resist. An exposure light 44 is emitted from the side of the microlens array 21 toward the transparent base member 28. It is preferable that the exposure light 44 is ultraviolet light. The exposure light 44 is collected by each microlens of the microlens array 21. The resist 41 is exposed by the exposure light 44. In this case, if multiple types of microlenses are included in the microlens array 21, the aperture diameter may change according to the focal length and diffusion angle of the microlens.

As the exposure light 44 illustrated in FIG. 5, it is possible to use light containing wavelengths that can cause the resist 41 to be exposed. It is preferable that the light source of the exposure light 44 is a light source capable of emitting light having substantially the same projection angle and pupil diameter as those of the image light 31 illustrated in FIG. 3. It is also preferable that the light source of the exposure light 44 is a light source having a small viewing angle.

Figure 7:
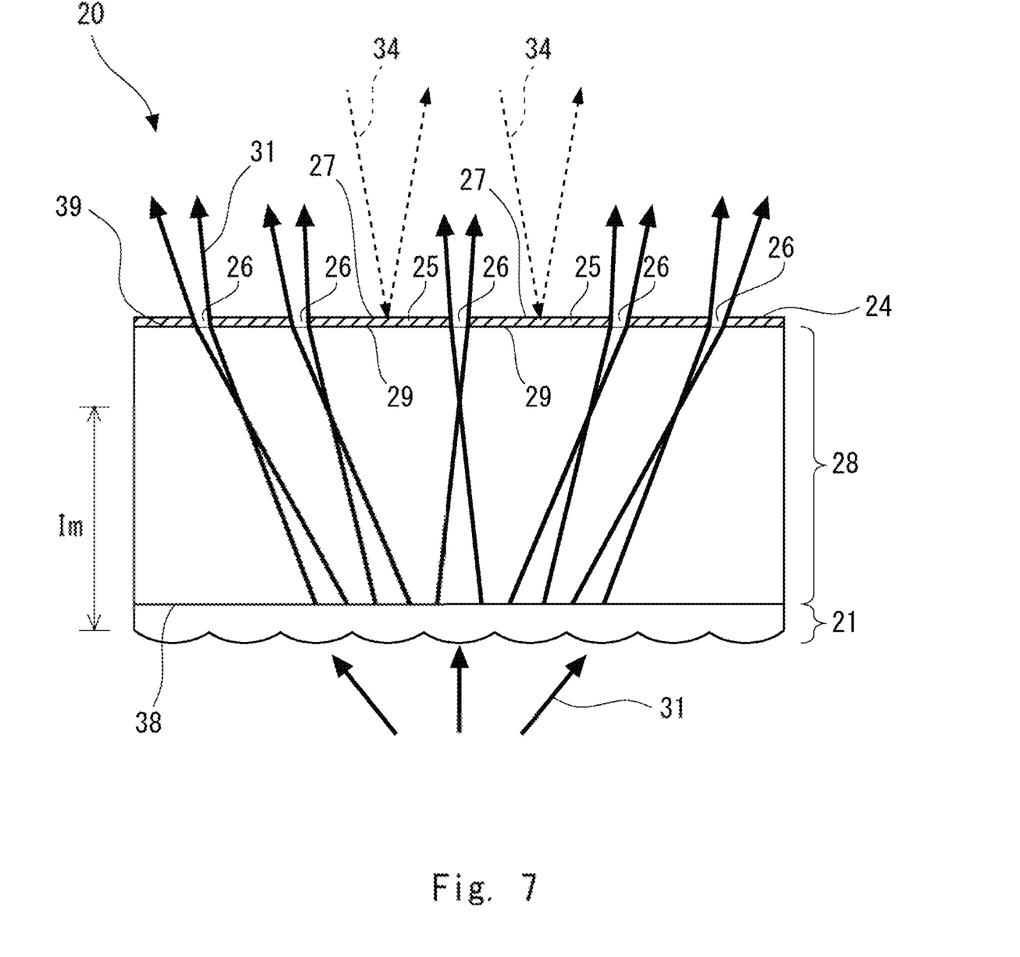
FIG. 7 is a schematic diagram of a light incident to the screen.

Implementation of the self-alignment exposure as described above is suitable for transmitting the exposure light through substantially the same optical path as the optical path of the image light 31 as illustrated in FIG. 7 which will be described later. Specifically, if the resist 41 illustrated in FIG. 4 is irradiated with the image light, the implementation is suitable for exposing only the portion of the resist 41 which is considered to allow the image light to pass through. The resist 41 in such a portion changes to the to-be-exposed resist 42 illustrated in FIG. 5.

Figure 6:
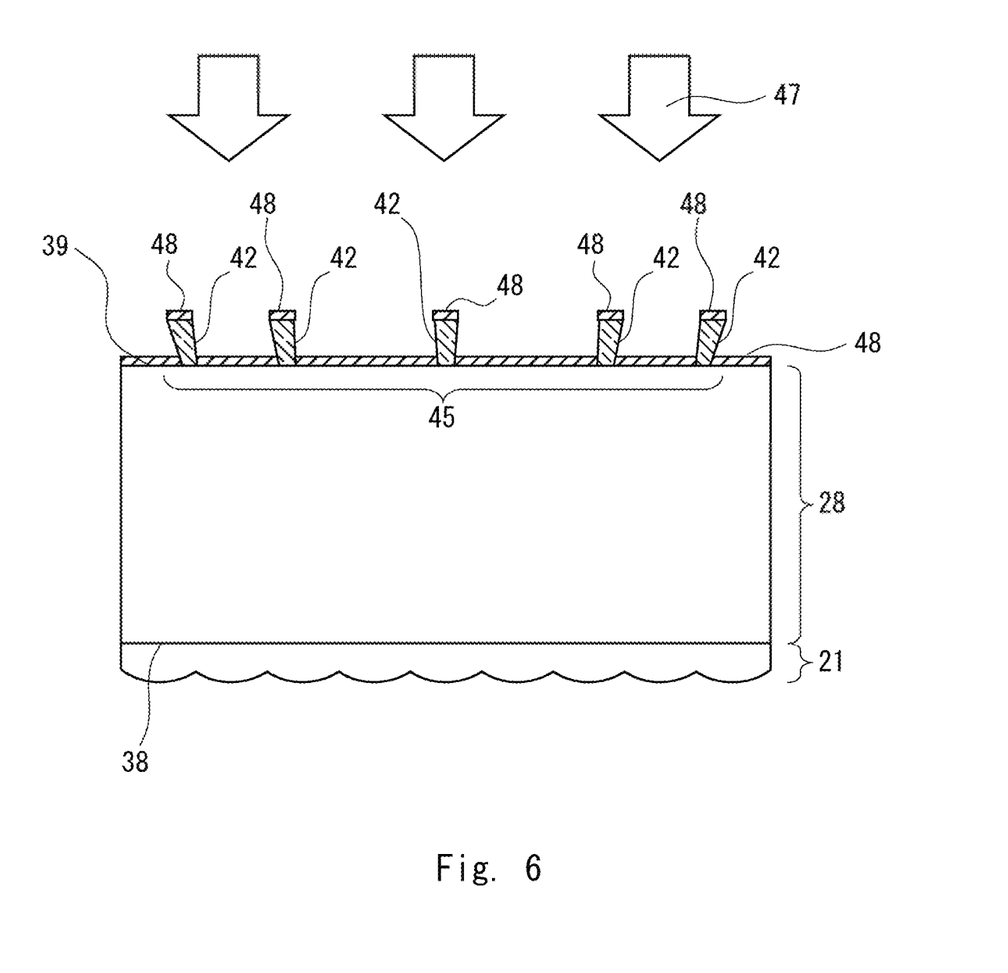
FIG. 6 is a schematic diagram of formation of a metal film.

FIG. 6 illustrates the step of forming the metal film 43. Before forming the metal film 43, the resist 41 and the to-be-exposed resist 42 illustrated in FIG. 5 are developed. Upon development, the exposed resist is exposed to the developing solution along with the transparent base plate 28.

As the developing solution, an alkaline developing solution suitable for the material used in the resist 41 may be used. As the development method, an immersion method, a shaking method, a paddle method, a spray method, or the like can be used. After the development, the resists are rinsed with pure water and then dried.

As described above, the unexposed portion of the resist 41 is removed. Thereafter, a resist pattern 45 illustrated in FIG. 6 is formed. A metal film 48 is formed on the top surface 39 on which the resist pattern 45 has been s formed. The formation of the metal film 48 may be performed by any one of, but not limited to, evaporation, sputtering, and electro-forming.

The resist pattern 45 illustrated in FIG. 6 is removed from the transparent base member 28. By removal of the resist pattern 45, the aperture array 24 composed of the metal film 48 (FIG. 6) is formed as illustrated in FIG. 7. The aperture 26 as illustrated in FIG. 2 is formed in the portion where the to-be-exposed resist 42 is removed. Thus, the screen 20 can be manufactured.

It is preferable that the removal of the resist pattern 45 illustrated in FIG. 6 is performed by a lift-off process. In the lift-off, it is preferable to bring the solvent into contact with the to-be-exposed resist 42. It is also preferable to remove the resist pattern 45 by immersing the resist pattern 45 together the transparent base member 28 in the lift-off solution. In order to promote the lift-off, the lift-off solution may be warmed. In order to promote the lift-off, vibration may be applied to the transparent base member 28.

In the above lift-off process, a portion that is not covered with the metal film 48 but is exposed needs to exist on the side surface of the to-be-exposed resist 42 illustrated in FIG. 6. From the above viewpoint, a vapor deposition method is suitable as a means for forming the metal film 48 illustrated in FIG. 6. In the vapor deposition method, metal particles travel straight as a vapor flow 47. Accordingly, the metal particles will not easily reach the side surface of the to-be-exposed resist 42 in a roundabout manner. Accordingly, the side surface of the to-be-exposed resist 42 is not easily covered with the metal film 48.

(Effect of Self-Alignment Exposure)

As illustrated in FIG. 7, the aperture array shields light except for the portion through which the image light 31 passes. This is because the exposure light 44 illustrated in FIG. 5 passes through the portion where the aperture 26 through which the image light 31 illustrated in FIG. 7 passes should formed by the above self-alignment method. Specifically, it is the gist of the resist pattern formation in accordance with this embodiment that the to-be-exposed resist 42 is provided at a portion where the aperture 26 is to be formed by the above self-alignment method.

In accordance with this embodiment, a screen is manufactured by the above self-alignment method, and a head up display can be manufactured by arranging such a screen in a head up display.

At this point, the screen 20 is arranged such that the image light 31 is projected from the microlens array 21 side to the screen 20 illustrated in FIG. 7. In the head-up display manufactured by such a method, the transmission of the image light 31 at the aperture 26 takes place efficiently. This is because the aperture 26 is precisely provided in advance at the position through which the image light 31 passes by the self-alignment method.

Further, according to the method of manufacturing a head-up display using the self-alignment method, at least one of the exposure light 44 illustrated in FIG. 5 and the image light 31 illustrated in FIG. 7 may be adjusted. Specifically, it may be adjusted such that the image point distance Ex of the exposure light 44 illustrated in FIG. 5 and the image point distance Im of the image light 31 illustrated in FIG. 7 are equal to each other. Alternatively, the difference between these image point distances is preferably in any one of the range of 10, 9, 8, 7, 6, 5, 4, 3, 2, and 1%.

As described above, the inner diameter of the aperture 26 illustrated in FIG. 7 can be made substantially equal to the diameter of the spread of the image light 31 on the cross section at the aperture 26. It is made possible to increase the efficiency of reflection of the external light 34 at the light shielding portion 25 while reducing the image light 31 reflected by the inner surface 29 of the light shielding portion 25.

According to the above aspect, the transmission efficiency of the image light and the reflection efficiency of the external light can be balanced in accordance with the design of the optical system of the head-up display illustrated in FIG. 3, i.e., the design of the optical system 30 illustrated in FIG. 3. Accordingly, adjustment can be implemented depending on the requirements based on the design of the head-up display such that both increase in the transmission efficiency of the image light and increase in the contrast can be achieved in a compatible manner.

(Relationship Between Image Point of Microlens and Lift-Off)

Referring again to FIG. 5, the image point 50 is an image point of the exposure light 44 with respect to the microlens of the microlens array 21. The image point 50 is in front of the applied resist 41 with respect to the microlens. In the figure, the image point 50 is in the transparent base member 28, but in other aspects, the image point 50 may be in the microlens array 21.

Here, the to-be-exposed resist 42 illustrated in FIG. 6 becomes thicker as it becomes more distant from the microlens array 21. The to-be-exposed resist 42 has a so-called reverse tapered shape. This is because the exposure light 44 has already passed the image point 50 at the time when the exposure light 44 reaches the to-be-exposed resist 42 as illustrated in FIG. 5, and the exposure light 44 is in the course of diffusion.

When the vapor flow 47 illustrated in FIG. 6 is sprayed from one direction to the top surface 39, the angle of the vapor flow 47 to the top surface 39 is not limited. This is because the side face of the to-be-exposed resist 42 having the inverse tapered shape will always be shaded from the vapor flow 47 in any direction.

Accordingly, it is preferable that the direction of the vapor flow 47 impinging on the top surface 39 illustrated in FIG. 6 is not inclined with respect to the normal direction of the top surface 39. Also, the direction of the vapor flow 47 may be inclined by 0° to 20°. The range of such inclination is preferably 0° to 10° and more preferably 0° to 5°. When the inclination becomes smaller, the metal film 46 can be thickened more efficiently.

The positional relationship between the image point 50 illustrated in FIG. 5 and the applied resist 41 can be adjusted as appropriate. Such a positional relationship can be adjusted by, for example, the thickness of at least either one of the transparent base member 28 and the base portion 19 of the microlens array 21. However, when the sum of these thicknesses increases and the image point distance Ex of the image point 50 does not change, then the distance from the main surface of the microlens array 21 to the resist 41 becomes relatively large. In the figure, the image point distance Ex of the image point 50 also takes into account the fact that the exposure light 44 is refracted at the interface between the microlens array 21 and the transparent base member 28. This also applies to the image point distance Im of the image light 31 illustrated in FIG. 7.

When the distance from the main surface of the microlens array 21 to the resist 41 becomes significantly larger than the image point distance Ex of the image point 50 as described above, there is a possibility that the exposure light 44 diffused at each of the adjacent microlenses in the microlens array 21 may overlap with each other in the resist 41. In this case, most of the resist 41 is exposed. Accordingly, the aperture 26 surrounded by the light shielding portion 25 as illustrated in FIG. 2, cannot be formed. As a result, the aperture array 24 illustrated in FIG. 3 cannot efficiently reflect the external light 34.

(Case where the Resist is Closer to the Main Surface of the Microlens than the Image Point)

Figure 8:
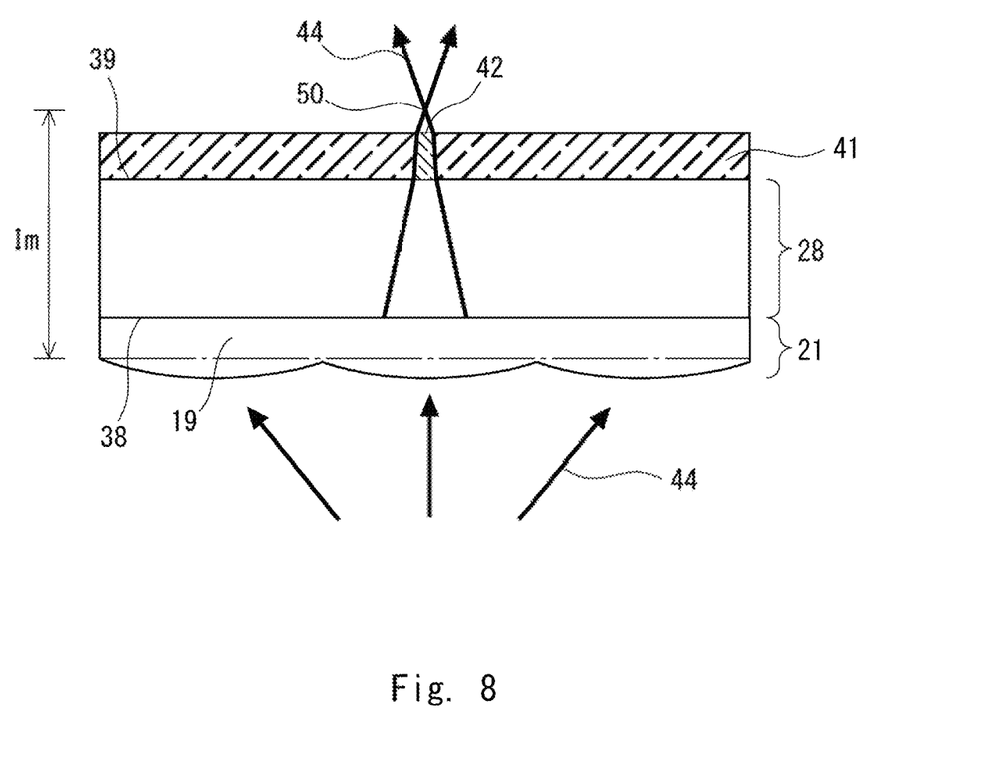
FIG. 8 is a schematic view of exposure of the resist.

FIG. 8 illustrates another aspect of the exposure of the resist. The exposure light 44 diffused by each microlens is partially omitted for convenience of explanation. The distance between the main surface of the microlens array 21 and the resist 41 becomes relatively small when the total thickness of the transparent base member 28 and the base portion 19 becomes small and the image point distance Ex of the image point 50 does not change. In the drawing, the image point of the exposure light 44 with respect to the microlens of the microlens array 21 is farther than the resist 41 with respect to the microlens. In FIG. 8, the image point distance Ex of the image point 50 also takes into account the fact that the exposure light 44 is refracted by the transparent base member 28 and the resist 41.

In the above case, the to-be-exposed resist 42 illustrated in FIG. 8 tapers away from the microlens array 21. The to-be-exposed resist 42 has a so-called forward tapered shape. This is because the exposure light 44 has not yet passed the image point at the time when the exposure light 44 reaches the to-be-exposed resist 42 as illustrated in the figure, and the exposure light 44 is in the course of convergence.

Figure 9:
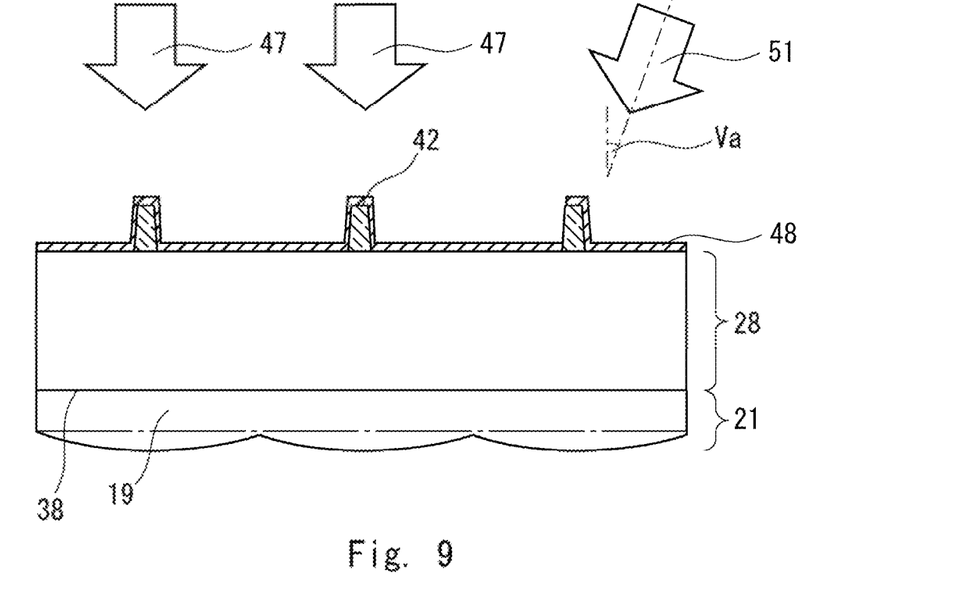
FIG. 9 is a schematic diagram of formation of a metal film.

In this case, there is a possibility that a problem arises in the lift-off described above. As illustrated in FIG. 8, when the to-be-exposed resist 42 is forwardly tapered, the lift-off of the resist pattern may not able to be performed. As illustrated in FIG. 9, when vapor deposition is performed so that the vapor flow 47 perpendicular to the top surface 39 is sprayed, the to-be-exposed resist 42 is completely covered with the metal particles. This is because no portion can be formed which is shaded from the vapor flow 47 on the side surface of the to-be-exposed resist 42.

In the above case, by inclining the vapor flow like the vapor flow 51 as illustrated in FIG. 9 a portion exposed is generated on the side surface of the to-be-exposed resist 42, where the exposed portion is not coated with the metal film 48. The magnitude of the inclination in the direction of the vapor flow 51 impinging on the top surface 39 is indicated by the vapor deposition angle Va with reference to the normal direction of the top surface 39. If the vapor deposition angle Va exceeds 60°, the shaded portion of the to-be-exposed resist 42 in the top surface 39 may become large. For this reason, a sufficient amount of metal for forming the light shielding portion cannot be fed to the shaded portion.

Figure 10:
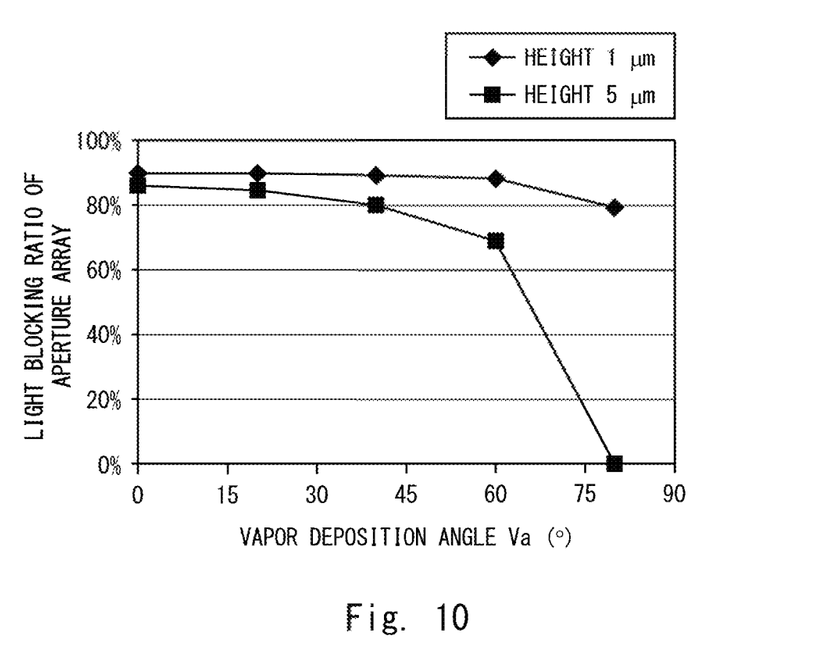
FIG. 10 is a graph showing the correlation between vapor deposition angle and light blocking ratio of the aperture array.

The graph of FIG. 10 illustrates the relationship between the vapor deposition angle Va and the light blocking ratio of the aperture array. The graph indicates the light blocking ratio of the aperture array when vapor deposition is performed while changing the deposition angle Va with respect to the top surface 39 illustrated in FIG. 9. The to-be-exposed resist 42 has a substantially cylindrical shape with a diameter of 10 μm. The pitch of the apertures of the aperture array formed on the basis of the to-be-exposed resist 42 is 20 μm.

The light blocking ratio illustrated in FIG. 10 indicates the ratio of the area where the metal film is formed on the top surface 39 illustrated in FIG. 9. The height of the to-be-exposed resist 42 is either 1 μm or 5 μm. In the case of a height of 5 μm as compared with the case of a height of 1 μm, the shaded portion of the to-be-exposed resist 42 becomes large. Accordingly, in the case of a height of 5 μm, the light blocking ratio is smaller than in the case of a height of 1 μm. When the height of the to-be-exposed resist 42 is 5 μm, the light blocking ratio sharply decreases when the deposition angle Va is larger than 60°.

Figure 11:
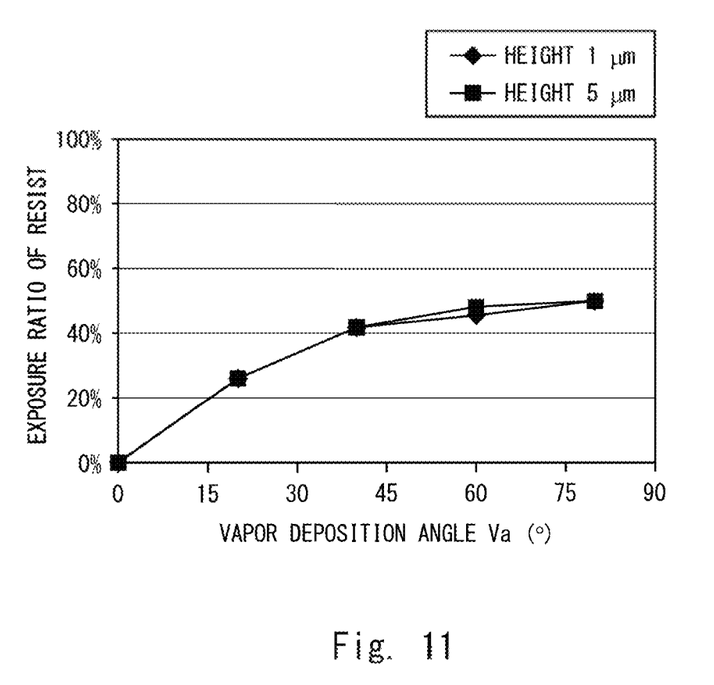
FIG. 11 is a graph showing the correlation between vapor deposition angle and exposure ratio.

The graph of FIG. 11 illustrates the relationship between the vapor deposition angle Va and the exposure ratio of the resist. The exposure ratio of the resist represents the exposure ratio with reference to the area of the side surface of the to-be-exposed resist 42 illustrated in FIG. 9. There is almost no difference in the exposure ratio between the case where the height of the to-be-exposed resist 42 is 1 μm and the case where it is 5 μm. By setting the deposition angle Va to be larger than 0°, the side surface of the to-be-exposed resist 42 can be exposed.

From the above, the vapor deposition angle Va illustrated in FIG. 9 can be determined by taking:
the thickness of the vapor:
the size of the portion to be exposed on the side surface of the to-be-exposed resist 42; and
the size of the portion of the top surface 39 which is not vapor-deposited due to being shadowed from the to-be-exposed resist 42
into account complementary manner.

Based on the above principle, the vapor deposition angle Va illustrated in FIG. 9 can be set within the range of 20° to 60°. The vapor deposition angle Va is preferably 45°. By virtue of such a deposition angle Va, the lift-off can be efficiently performed by suppressing the deposition of metal on the side surface of the to-be-exposed resist 42. Further, it is made possible to efficiently deposit the metal on the top surface 39 where the light shielding portion is to be formed.

It should be noted that the present disclosure is not limited to the above-described embodiment and can be appropriately modified without departing from the spirit of the invention. For example, the transparent base member 28 and the microlens array 21 illustrated in FIG. 1 may be shaped as a seamless integral member.

EXAMPLE

A microlens array sheet including the transparent base member 28 and the microlens array 21 illustrated in FIG. 4 was formed. The microlens array 21 was shaped on the transparent base member 28 made of a polycarbonate film using ultraviolet curable resin. The thickness of the polycarbonate film was 100 μm. An acrylic resin was used as ultraviolet curable resin. The irradiation amount of ultraviolet ray was 500 mJ/cm$^2$.

As illustrated in FIG. 4, the resist 41 was applied to the back side of the microlens array sheet, i.e., the top surface 39. Coating was carried out by a spin coating method. The number of revolutions of the microlens array sheet as a workpiece was adjusted so that the film thickness of the resist 41 was 5 μm. As the resist 41, PMER N-CA 3000 which is a negative type photoresist manufactured by TOKYO OHKA KOGYO CO., LTD. was used. The resist 41 was dried in an oven at 70° C. for 20 minutes.

The microlens array sheet was set on the stage of a UV exposure apparatus. At this point, the microlens array 21 illustrated in FIG. 5 was placed as the upper side. Ultraviolet rays were emitted from the microlens array 21 side. The exposure amount was 500 mJ/cm². After the exposure, the microlens array sheet was subjected to PEB (post exposure bake) treatment in an oven at 70° C. for 20 minutes.

For development, the microlens array sheet was immersed in an organic alkaline developing solution (TMAH 2.38%). Also, the microlens array sheet was shaken for 3 minutes. The microlens array sheet taken out from the developer was rinsed with pure water and further dried.

The metal film 48 illustrated in FIG. 6 was formed by a vacuum deposition apparatus, where the vapor deposition angle was 45°. The weight of the vapor deposition source was 10.4 g. The thickness of the vapor-deposited film was about 200 nm. The lift-off was carried out by immersing the vapor-deposited microlens array sheet in NMP (n-methyl-2-pyrrolidone). The microlens array sheet was shaken for 180 seconds. As a result, the to-be-exposed resist 42 was melted to form the aperture array 24 illustrated in FIG. 7. Thus, the screen of the example was obtained. The screen taken out from the NMP was rinsed with pure water and air-dried.

The item that has undergone the processes up to shaping of the microlens array by ultraviolet curable resin according to the example was defined as the screen of a comparative example. In the example and the comparative example, the reflection characteristics on the back side of the microlens array sheet, i.e., on the top surface 39 side illustrated in FIG. 7 were evaluated.

Figure 12:
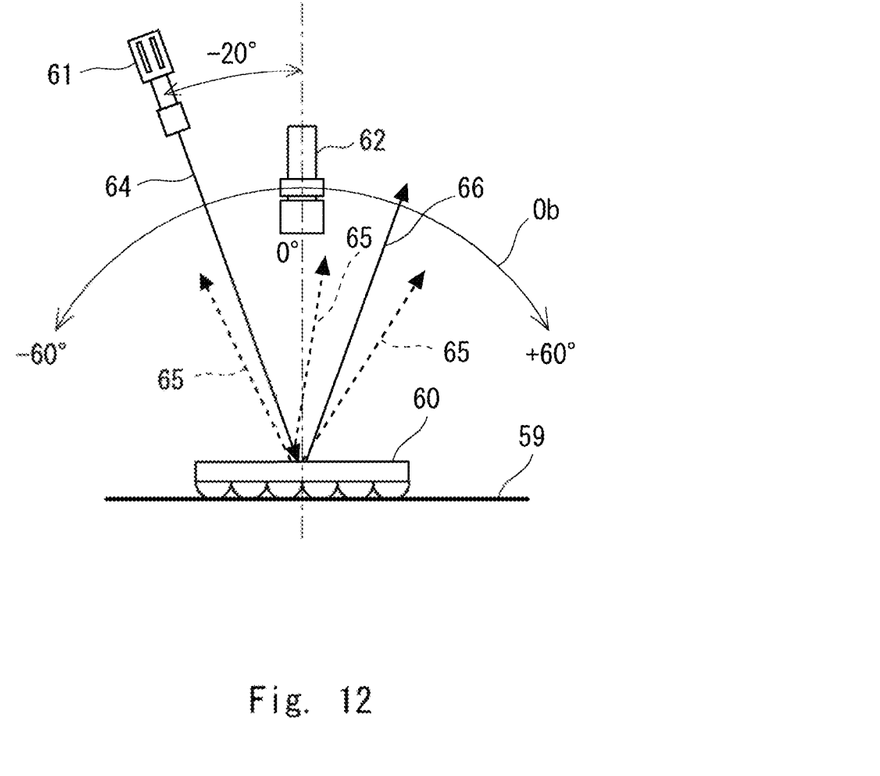
FIG. 12 is a schematic diagram of an apparatus for evaluating reflection characteristics.

FIG. 12 is a schematic diagram of an apparatus for evaluating the reflection characteristics. This apparatus is a goniometer for measuring the intensity distribution of the reflected light according to the reflection angles when the test screen 60 is irradiated with the external light 64. The test screen 60 was placed on the black sheet 59 with the microlens array as the lower side.

As the external light 64 illustrated in FIG. 12, LED quasi-parallel light having a divergence angle of 5° or less was used. A light source 61 that emits such a parallel light was arranged. A part of the external light 64 is diffusely reflected on the test screen 60 and becomes diffuse reflection light 65. A part of the external light 64 is specularly reflected by the test screen 60 and becomes specular reflection light 66. The specular reflection light 66 is inclined by +20°.

The intensities of the diffuse reflection light 65 and the specular reflection light 66 illustrated in FIG. 12 were measured using the 2-D luminance meter 62. The reflection angle was changed by changing the observation angle Ob of the 2-D luminance meter 62 from −60 to +60°. The observation angle Ob when the 2-D luminance meter 62 faces the test screen 60 directly was set to 0°.

In this measurement, it is assumed that the mounting angle of the test screen 60 when the test screen 60 is installed in the head-up display is 20°. Accordingly, the optical axis of the light source 61 is out of alignment by −20° with the optical axis of the 2-D luminance meter 62 at the observation angle Ob of 0°.

Figure 13:
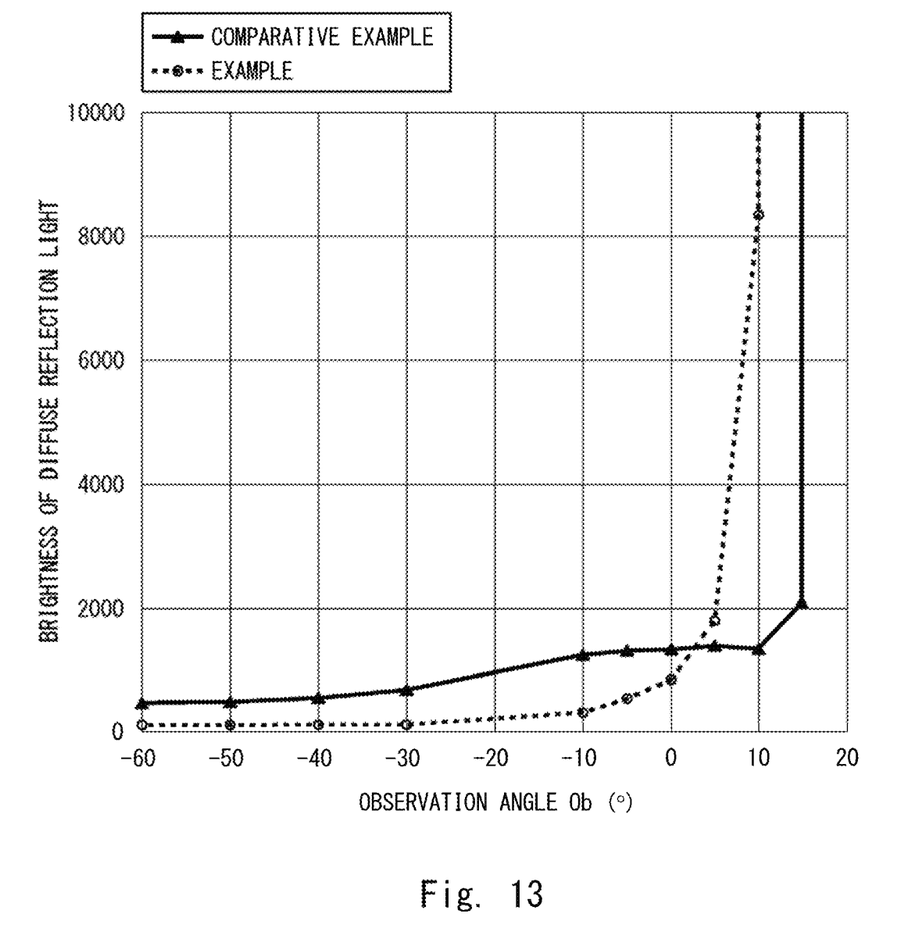
FIG. 13 is a graph showing the correlation between an intensity of a reflected light and an irradiation angle.

FIG. 13 is a graph showing the correlation between the brightness of the diffuse reflection light and the observation angle. The unit of the brightness of diffuse reflected light is cd/m². The intensity of the specular reflection light 66 (FIG. 12) to be observed when the observation angle Ob is +20° exceeded the upper limit of the graph range.

As illustrated in FIG. 13, it was considered that the intensity of specularly reflected light was larger than in the comparative example in the screen of the example. However, in the region of 0° or less, the intensity of the diffuse reflected light was smaller than that in the comparative example. Accordingly, it is considered that internally reflected light generated by reflection of external light reaching the microlens is blocked by the aperture array.

As described above, in this measurement, the inclination angle when the screen is attached to the head-up display is 20°. Accordingly, strong specularly reflected light is prevented from entering the observer's eyes.

In the case of the screen of the comparative example, it was found that the observer can visually recognize a part of the internally reflected light generated by the microlens. Such internally reflected light lowers the image contrast. Comparison between the comparative example and the example shows that improvement of image contrast can be expected by suppressing the leakage of the internally reflected light by the aperture array of the metal film of this example.

This application claims priority based on Japanese Patent Application No. 2016-003410 filed on Jan. 12, 2016, the entire contents of which are incorporated herein by reference.

REFERENCE SIGNS LIST 19 base member, 20 screen, 21 microlens array, 22 microlens, 24 aperture array, 25 light shielding portion, 26 aperture, 27 outer surface, 28 transparent base member, 29 inner surface, 30 optical system, 31 image light, 32 diffusion, 34 external light, 35 concave mirror, 36 light absorbing portion, 38 bottom surface, 39 top surface, 41 resist, 42 to-be-exposed resist, 43 metal film, 44 exposure light, 45 resist pattern, 46 metal film, 47 vapor flow, 48 metal film, 50 image point, 51 vapor flow, 59 sheet, 60 test screen, 61 light source, 62 2-D luminance meter, 64 external light, 65 diffuse reflection light, 66 specular reflection light, Ex image point distance of exposure light, Im image point distance of the image light. Ob observation angle, Va vapor deposition angle

The invention claimed is:

1. A head-up display, comprising:
a transmissive screen comprising a microlens array,
wherein the screen comprises an aperture array disposed on a surface opposite to a surface on which the microlens array is disposed, in which a light shielding portion of the aperture array is a metal film, wherein
the transmissive screen is tilted such that the transmissive screen is inclined with respect to an optical axis of an image light projected onto the transmissive screen from a microlens array side, and
the head-up display further comprises a light absorbing portion absorbing the external light reflected by the light shielding portion.

2. The head-up display according to claim 1, wherein the metal film is a vapor-deposited film.

3. The head-up display to claim 1, wherein an outer surface of the metal film has a mirror surface.

4. The head-up display according to claim 1, wherein the outer surface of the metal film has a reflectance of 80% or more of light having a wavelength of 380 nm to 780 nm.

5. The head-up display according to claim 1, wherein
the image light is projected onto the screen from the microlens array side, and
an inner diameter of an aperture of the aperture array is equal to or larger than a diameter of spread of the image light on a cross section at the aperture.

6. The head-up display according to claim 1, wherein the light shielding portion reflects an external light entering from the opposite direction to the image light, an optical axis of the external light is parallel to the optical axis of the image light and an optical axis of the external light reflected by the light shielding portion is not parallel to the optical axis of the image light.

7. A method of manufacturing a transmissive screen comprising a microlens array and an aperture array disposed on an opposite side of the microlens array, the method comprising, in forming the aperture array on a transparent base member on one side of which the microlens array is formed:

applying a negative resist to an opposite surface of the transparent base member on one surface of which the microlens array is disposed;

irradiating the transparent base member with an exposure light, the exposure light being emitted toward the transparent base member from a microlens array side;

exposing the negative resist with the exposure light and further developing the negative resist to form a resist pattern;

forming a metal film on a surface of the transparent base member on which the resist pattern is formed; and removing the resist pattern to form the aperture array made of the metal film;

wherein an image point of the exposure light with respect to a microlens of the microlens array is in front of the negative resist applied to the opposite side of the transparent base member with respect to the microlens, the metal film is formed by vapor deposition, and the resist pattern is removed by lift-off.

8. The method according to claim 7, wherein, in the vapor deposition, a direction of a vapor flow impinging on a surface of the transparent base member is not inclined or is inclined by from 0° to 20° with respect to a normal direction of the surface of the transparent base member.

9. A method of manufacturing a head-up display whose transmissive screen is produced by the method according to claim 7 and arranged such that an image light is projected from the microlens array side to the transmissive screen, wherein at least one of the exposure light and the image light is adjusted so that an image point distance of the exposure light with respect to a microlens of the microlens array is equal to an image point distance of the image light.

* * * * *